United States Patent

[11] 3,534,776

| [72] | Inventor | Lafayette E. Gilreath |
| --- | --- | --- |
| | | 7623 Arnim, Houston, Texas 77017 |
| [21] | Appl. No. | 735,620 |
| [22] | Filed | June 10, 1968 |
| [45] | Patented | Oct. 20, 1970 |

[54] SEALED PIPE JOINT AND RELEASING MEANS THEREFOR
6 Claims, 2 Drawing Figs.

| [52] | U.S. Cl. | 138/109 |
| --- | --- | --- |
| [51] | Int. Cl. | F16l 17/06 |
| [50] | Field of Search | 138/109; 277/207A; 285/131 |

[56] References Cited

UNITED STATES PATENTS

| 3,246,671 | 4/1966 | Stein et al. | 138/109 |
| --- | --- | --- | --- |

FOREIGN PATENTS

| 1,082,156 | 9/1967 | Great Britain | 138/109 |
| --- | --- | --- | --- |
| 39,160 | 5/1956 | Poland | 138/109 |

*Primary Examiner*—Louis K. Rimrodt
*Attorney*—Charles E. Lightfoot

ABSTRACT: A pipe joint of the type having bell end portions formed on a tubular connector member into whose ends the ends of sections of pipe to be connected may be inserted, each of the bell ends having an inwardly opening annular groove spaced longitudinally inwardly from its outer end and a tapering portion extending longitudinally outwardly from the groove and which merges with a straight cylindrical portion longitudinally outwardly of the tapered portion. Resilient sealing means such as O-rings are positioned loosely in the grooves for sealing engagement with the ends of the pipe sections when the same are inserted into the connector through the bell ends with the O-rings in the grooves to close the joint against leakage so that the application of fluid pressure to the pipe will apply pressure to the seal rings to move the same into the tapered portions to more tightly engage the rings with the pipe section and connector member. The connector member is provided with releasing elements in the form of sleeves slidable in the bell ends on the ends of the pipe sections to engage the inner ends of the sleeves with the O-rings to move the O-rings out of the tapered portion back into the grooves to release the pipe ends for removal from the connector member.

Patented Oct. 20, 1970

3,534,776

Lafayette E. Gilreath
INVENTOR

BY
Charles E. Lightfoot
ATTORNEY

SEALED PIPE JOINT AND RELEASING MEANS THEREFOR

BACKGROUND OF THE INVENTION

The invention relates to pipe joints of the type in which one section of pipe is formed with a bell end portion into which the end of another section may be inserted, the bell end having an enlargement forming an inwardly opening annular groove or recess and a tapering portion extending longitudinally from the groove toward the open end of the bell. Such pipe joints are also provided with a resilient seal forming element, such as an O-ring which is disposed loosely in the groove of the bell end and through which the end of said other section may be extended. The pipe end is inserted into the bell into sealing contact with the ring whereby the joint is sealed on initial assembly of the parts and whereby the application of fluid under pressure to the pipe causes the exertion of pressure on the O-ring tending to force the O-ring into the tapered portion of the bell to more tightly engage the O-ring with the bell and pipe end.

In pipe joints of this kind the tightening of the seal in the tapered portion of the bell securely holds the joint against disassembly and attempts to disassemble the joint by pulling the parts longitudinally apart merely result in more tightly wedging the O-ring in the tapered portion of the bell so that the pipe end cannot be pulled out of the bell. Moreover, attempts to release the O-ring from the tapered portion of the bell by pushing the pipe end further into the bell do not usually accomplish releasing of the parts, since the O-ring is again wedged into the tapered portion when an effort is made to pull the pipe end out of the bell and frequently there is not sufficient end clearance between the inner end of the pipe and the bell to allow the pipe end to be further inserted in the bell to release the O-ring.

The present invention has for an important object the provision of a pipe joint structure of the type mentioned which is constructed to cause the seal forming means to be more tightly wedged into the tapering portion of the bell end to tighten the seal upon an increase in the pressure of fluid in the pipe and which includes means for moving the seal forming means out of the tapered portion of the bell to release the seal to permit the joint to be easily disassembled.

SUMMARY OF THE INVENTION

The pipe joint of the invention comprises a tubular connector member having a bell end enlargement at each end which is formed with an inwardly opening annular groove or recess spaced longitudinally inwardly from the end of the member and a tapering portion extending from one side of the groove toward the free end of the member and which merges at its outer end with a straight cylindrical portion. The internal diameter of the portion of the member between the bell ends is of a size to closely fit the external surface of a pipe end which is to be inserted in the member, while the internal diameter of the bell is larger than the external diameter of the pipe to be inserted, so that a resilient seal forming member may be loosely inserted in the groove for surrounding sealing contact with the pipe end and with the connector member in the groove upon initial assembly of the joint by the insertion of the pipe end into the connecting member through the bell and seal forming member, so that the introduction of fluid under pressure into the pipe will exert a force on the seal forming means tending to urge the same longitudinally into wedging engagement with the pipe end and connector member in the tapered portion to tighten the seal.

The joint is further provided with releasing means in the form of a sleeve slidably disposed in each of the bell ends between the pipe end and the bell end of the connector member in position for engagement with the seal forming means upon inward sliding of the releasing means to move the sealing forming means out of the tapered portion to release the pipe end and bell therefrom to permit disassembling of the joint. The bell end and releasing means are provided with means positioned for coaction upon inward or outward sliding movement of the releasing means in the bell end to limit such sliding movement in either direction to prevent separation of the releasing means from the connector member.

DETAILED DESCRIPTION OF A PARTICULAR EMBODIMENT OF THE INVENTION

Figures 1, 2:
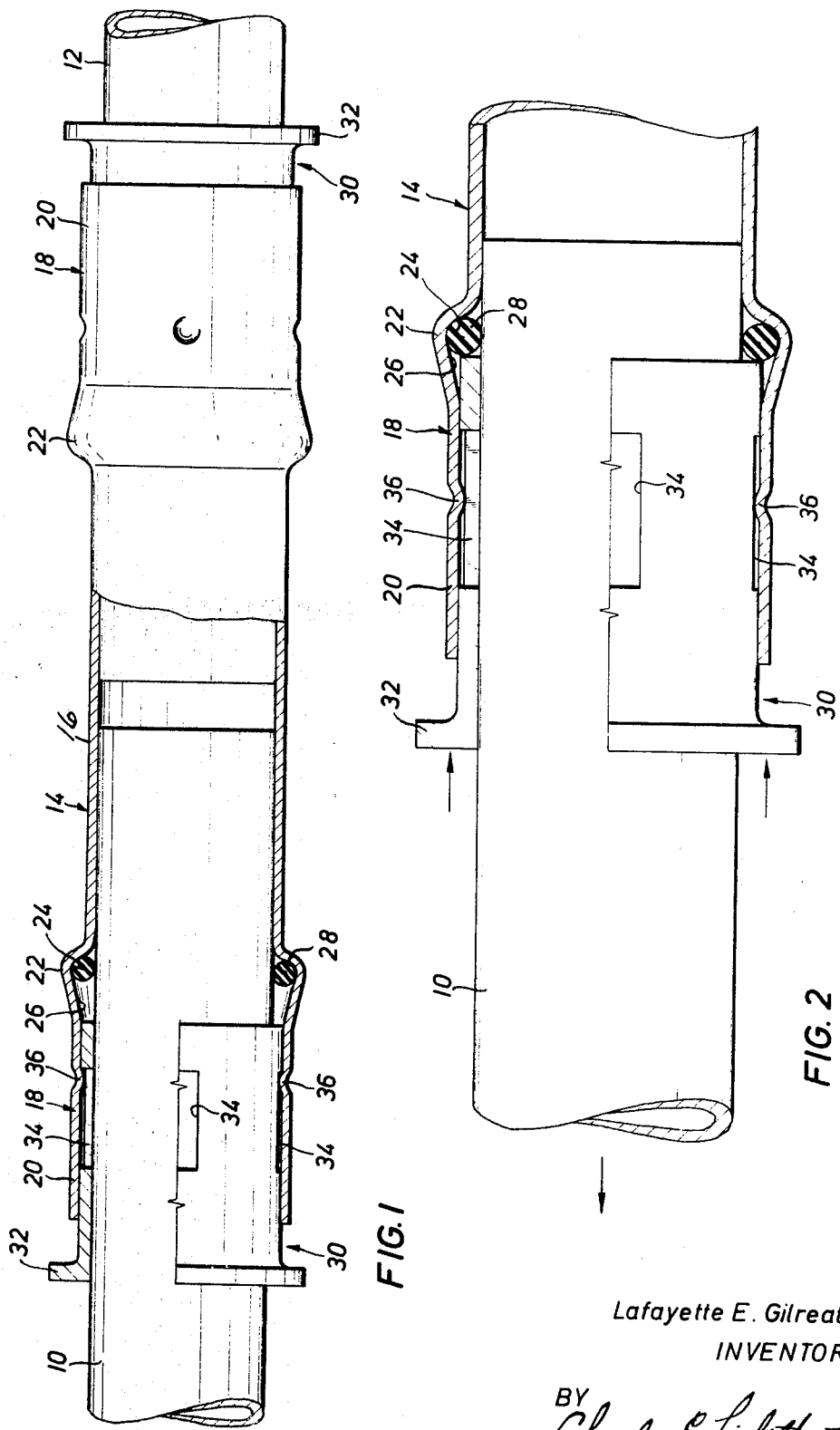
FIG. 1 is a side elevational view of a preferred embodiment of the invention, partly broken away and partly in cross section, showing the pipe joint in assembled condition.
FIG. 2 is a view similar to that of FIG. 1, on a somewhat larger scale, illustrating the manner in which the parts of the joint are released preparatory to disassembling the same.

The invention is illustrated herein in connection with its use in the assembling of sections of pipe, such as the sections designed 10 and 12, which may be formed of any suitable material, such as metal or plastic and which in the present instance are of a relatively thin-walled type.

The invention includes a tubular joint section or connector member or coupling 14, formed with a medial portion 16 whose inside diameter is of a size to allow the ends of the pipe section 10 and 12 to be snuggly fitted therein, and which is formed at each end with an enlargement or bell end portion 18 of somewhat larger internal diameter than the external diameter of the pipe sections to be joined. Each of the end portions 18 has a straight cylindrical outer end portion 20, and is formed longitudinally inwardly thereof with a radially outwardly expanded, annular enlargement 22, forming an inwardly opening, annular groove or recess 24 having a rounded bottom surface and a longitudinally tapering side wall portion 26 which merges with the straight cylindrical portion 20.

The groove or annular recess 24 is of sufficient size at the location of its rounded bottom to loosely receive a seal forming element, such as a resilient O-ring 28, formed of rubber or similar resilient material between the bottom of the groove and the external surface of a pipe section, such as the section 10 or 12 when inserted in the connector member through the bell end portion thereof, as shown in FIG. 1. The tapering wall portion 26, however, diminishes in diameter from the groove 24 toward the straight cylindrical end portion 20, so that any outward movement of the O-ring in the bell end results in compression of the ring between the pipe section and the connector member.

In assembling a pipe joint of this kind, the O-rings 28 may first be inserted loosely in the bell ends of the connector member into the grooves 24 and the ends of the pipe sections 10 and 12 inserted into the bell ends and through the O-rings as seen in FIG. 1. With the joint thus made up, fluid under pressure in the pipe line so assembled may flow into the bell ends of the connector members exteriorily of the pipe sections to exert an outward pressure longitudinally on the O-rings tending to urge the O-rings longitudinally outwardly along the tapered wall portions 26 to tightly compress the rings into fluid tight sealing engagement between the sections and connector member. By this arrangement an increase in the pressure in the pipe line results in a tighter compression of the seal forming means to form a tight seal between the pipe and the connector member. Moreover, once the seal forming rings have been moved into sealing engagement with the pipe sections and connector member, the sections will be securely held against longitudinal removal from the member by the wedging action of the O-rings between the external surfaces of the sections and the tapered portions 26 of the connector, thus holding the joint securely assembled.

For the purpose of releasing the sections from the connector member to permit disassembling of the joint, a sleeve-like, cylindrical actuator element 30 is slidably positioned in each of the bell end portions of the connector member so that it will be slidable longitudinally on the end portion of the pipe section inserted therethrough as shown in FIG. 1.

The actuator element is preferably provided with an external annular flange or the like 32 at its outer end and is formed mediate its ends with one or more elongated openings 34 located within the bell end portion of the connector member. The actuator elements 30 are positioned in the bell ends of the connector means and the straight cylindrical portions of the bell ends may then be indented or dimpled inwardly into the openings 34 as shown at 36 to prevent the removal of the actuator elements from the connector member. The actuator elements are of sufficient length and the elongated openings 34 are of sufficient extent to allow the elements to be moved to the inactive position shown in FIG. 1 with the inner ends of the elements withdrawn from the tapered portions 26 of the bell ends to allow the O-rings 28 to be moved into sealing engagement with the pipe sections and connector member in the tapered portions, or to the releasing position shown in FIG. 3 in which the inner ends of the elements are engaged with the O-rings to move the O-rings off of the tapered portions 26 back into the grooves 24 to release the seal between the pipe sections and the connector member to allow the pipe sections to be pulled out of the member.

In assembling the joint, constructed as described above, the ends of the pipe sections to be connected are inserted into the bell ends of the connector member 14, through the actuator elements 30 in their retracted or inactive positions and through the O-ring seals 28 in the grooves 24. With the pipes thus connected, the pressure of fluid in the pipe line thus made up will cause the O-rings to move longitudinally outwardly on the tapered portions 26 into tight sealing engagement with the pipe sections and the connector member.

By selecting the O-rings of a size to be in sealing contact with the pipe sections and the connector member 14 in the grooves 24, the joint will be sealed against leakage when initially assembled, and the application of fluid under pressure to the pipe line will then cause a tightening of the seals in accordance with the increase in pressure.

When it is desired to disassemble the joint the actuator elements 30 are moved longitudinally inwardly from the inactive position of FIG. 1 to the releasing position shown in FIG. 2, to move the O-rings out of the tapered portions 26 back into the groove 24 so that the pipe ends may then be pulled out of the connector member.

It will thus be seen that the invention provides a pipe joint structure which is easily assembled, which is sealed against leakage when initially assembled and more tightly sealed upon an increase in the pressure of fluid in the pipe and in which means is provided for quickly and easily releasing the parts for disassembly.

It will be appreciated that the joint of the invention may also be constructed by forming the end portion of one section of pipe with a bell end similar to those of the connector member into which the end portion of another pipe section may be inserted, instead of making use of the double ended connector member into whose ends the ends of two pipe sections are inserted as described above.

The invention is disclosed herein in connection with a particular embodiment of the same, which is intended by way of illustration only, it being understood that various changes can be made in the construction of the parts within the spirit of the invention.

I claim:

1. In a joint for connecting together sections of pipe:
   a first pipe section having one end portion of uniform outside diameter through the length thereof;
   a second pipe section having a bell end portion of larger internal diameter than said one end portion and through which said one end portion may be inserted into said second section inwardly beyond said bell end portion and formed with an inwardly opening annular groove spaced longitudinally inwardly from its outer end and a tapering portion extending from said groove toward said outer end;
   an annular, resilient, seal forming element adapted to be disposed in said groove in surrounding relation to said one end portion and in sealing contact with said one end portion and said bell end portion in said groove when said one end portion is extended through said bell end portion, said seal forming element being movable into said tapering portion under the influence of an increase in the pressure of fluid in said sections into wedging engagement with said sections in said tapering portion; and
   means movably disposed in said bell end portion for longitudinal movement therein between said sections in position for engagement with said seal forming means in said tapered portion to move said seal forming means out of said tapering portion into said groove upon longitudinal movement of said movable means in one direction and out of such engagement upon longitudinal movement of said movable means in the other direction.

2. The joint structure as claimed in claim 1, wherein said bell end portion is formed longitudinally outwardly of said tapered portion with a straight cylindrical portion and including:
   means on said movable means and said cylindrical portion positioned for coaction to limit longitudinal movement of said movable means outwardly of said bell end portion.

3. The joint structure as claimed in claim 2, wherein said movable means is:
   a cylindrical member formed with a longitudinally elongated opening and said means for limiting longitudinal movement of said movable means outwardly of said bell end portion includes; and
   means on said straight cylindrical portion extending into said opening.

4. The joint structure as claimed in claim 1 wherein said movable means is:
   a cylindrical member; and
   means on said member positioned for engagement with the open end of said bell end portion to limit longitudinal movement of said member inwardly of said bell end portion.

5. The joint structure as defined in claim 1, wherein said second pipe section is formed longitudinally inwardly of said bell end portion with a portion of smaller external diameter than the minimum internal diameter of said bell portion into which said one end portion may be snugly inserted through said bell end portion.

6. The joint structure as defined in claim 1 wherein said second pipe section is formed with a bell end portion at each end and has a portion located between said bell end portions into which said one end portion may be snugly inserted through said bell end portion.